(12) United States Patent
Nachenberg et al.

(10) Patent No.: US 7,562,391 B1
(45) Date of Patent: Jul. 14, 2009

(54) REDUCING FALSE POSITIVE INDICATIONS OF BUFFER OVERFLOW ATTACKS

(75) Inventors: Carey S. Nachenberg, Northridge, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 836 days.

(21) Appl. No.: 11/109,215

(22) Filed: Apr. 18, 2005

(51) Int. Cl.
G06F 11/00 (2006.01)
G06F 17/30 (2006.01)

(52) U.S. Cl. .................... 726/23; 726/22; 726/26

(58) Field of Classification Search ............... 726/23, 726/26, 22
See application file for complete search history.

(56) References Cited

OTHER PUBLICATIONS

Vulnerability scanning for buffer overflow Aishwarya Iyer; Liebrock, L.M.; Information Technology: Coding and Computing, 2004. Proceedings. ITCC 2004. International Conference on vol. 2, 2004 pp. 116-117.*
Protection against indirect overflow attacks on pointers Zhu, G.; Tyagi, A.; Information Assurance Workshop, 2004. Proceedings. Second IEEE International 2004 pp. 97-106.*
A processor architecture defense against buffer overflow attacks McGregor, J.P.; Karig, D.K.; Shi, Z.; Lee, R.B.; Information Technology: Research and Education, 2003. Proceedings. ITRE2003. International Conference on Aug. 11-13, 2003 pp. 243-250.*
Garza, V., "Entercept Intercepts Threats," Oct. 1, 2004, [online] [Retrieved on Sep. 8, 2005] Retrieved from the Internet<URL:http://www.infoworld.com/article/04/10/01/40TCentercept_1.html>.
Lee, W. et al., "A Framework For Constructing Features And Models For Intrusion Detection Systems," ACM Transactions On Information And System Security, Nov. 2000, pp. 227-261, vol. 3, No. 4.
"McAfee System Protection McAfee® VirusScan® Enterprise 8.0i," 2005, [online] [Retrieved on Sep. 8, 2005] Retrieved from the Internet<URL:http://www.mcafeesecurity.com/us/products/mcafee/antivirus/desktop/vs.htm>.
Mitchell, D., "Cisco Security Agent 4.0," Sep. 28, 2004 [online] [Retrieved on Sep. 8, 2005] Retrieved from the Internet<URL:http://www.techworld.com/security/reviews/index.cfm?productID=226&reviewid=220>.
"Securing Network Endpoints Without Signatures: A Policy-Based Approach To Host Intrusion Protection," Cisco Systems, Inc., 1992-2003, pp. 1-12.

* cited by examiner

*Primary Examiner*—David Y Jung
(74) *Attorney, Agent, or Firm*—Fenwick & West LLP

(57) ABSTRACT

Certain events, such as data input operating system calls, are likely to initiate a buffer overflow attack. A timing module generates timestamps that indicate when such possible initiating events occur. The timestamp is associated with a particular process and/or thread executing on the computer. If subsequent evidence of a buffer overflow attack is detected on the computer, the timestamps are consulted to determine if a possible initiating event occurred recently. If there is a recent initiating event, a buffer overflow attack is declared. Evidence of a buffer overflow attack can include receiving a signal from the processor indicating that the processor was asked to execute an instruction residing in non-executable memory. Evidence of a buffer overflow attack can also include detecting an action on the computer that malicious software is likely to perform, such as opening a file or network connection, being performed by an instruction residing in non-executable memory.

23 Claims, 4 Drawing Sheets

REDUCING FALSE POSITIVE INDICATIONS OF BUFFER OVERFLOW ATTACKS

BACKGROUND OF THE INVENTION

1. Field of the Invention

This invention pertains in general to computer security and in particular to detecting buffer overflow attacks initiated by viruses, worms, and other types of malicious computer software.

2. Description of the Related Art

Many computers are susceptible to a type of attack called a "buffer overflow attack." Malicious software, such as a computer virus or worm, can initiate this attack by exploiting a flaw in legitimate software, such as an operating system, executing on the computer. Typically, the flaw involves an operation where the legitimate software reads a data value into a memory buffer allocated for storing the value. If the legitimate software fails to check whether the data value fits within the buffer, the data value can overflow the buffer and overwrite other computer memory.

Malicious software exploits this flaw by sending specially-crafted malicious data values to the legitimate program. The malicious data overflows the buffer and inserts malicious code into the computer's memory. In one attack, the malicious data overwrite an address in the stack. In another attack, the malicious data overwrites pointers to functions that the legitimate software uses to maintain the memory heap. Both of these attacks cause the computer to execute the inserted malicious code.

The malicious code launched by a buffer overflow attack is usually stored in a region of computer memory intended to hold non-executable data. Therefore, one way to detect buffer overflow attacks is to determine whether the computer is executing code held in a memory region designated for executable code or non-executable data. To this end, some computer processors have built-in technology for invoking an exception if code to be executed is held in a non-executable memory region. Software applications can also determine whether code is in a non-executable region.

A significant problem with the buffer overflow detection techniques described above is that they often provide false positive detections of attacks. There are many legitimate programs, such as Just-In-Time compilers, that execute code stored in non-executable memory regions. These false positive detections are undesirable because they can interfere with the normal operation of the computer and confuse end-users.

Therefore, there is a need in the art for a way to detect buffer overflow attacks while reducing the number of false positive detections made by conventional techniques.

BRIEF SUMMARY OF THE INVENTION

The above need is met by correlating evidence of possible buffer overflow attacks with possible attack initiating events. Possible attacks that lack corresponding initiating events are disregarded, which results in a substantial decrease in false positive attack detections. In one embodiment, events on the computer that can initiate a buffer overflow attack, such as data input system calls, are detected. A timestamp is generated for each such event. The timestamp can be associated with a particular process and/or thread executing on the computer. If subsequent evidence of a buffer overflow attack is detected on the computer, the timestamps are consulted to determine if the process/thread performed a possible initiating event recently, such as within the last 10 milliseconds. If there is a recent initiating event, a buffer overflow attack is declared.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
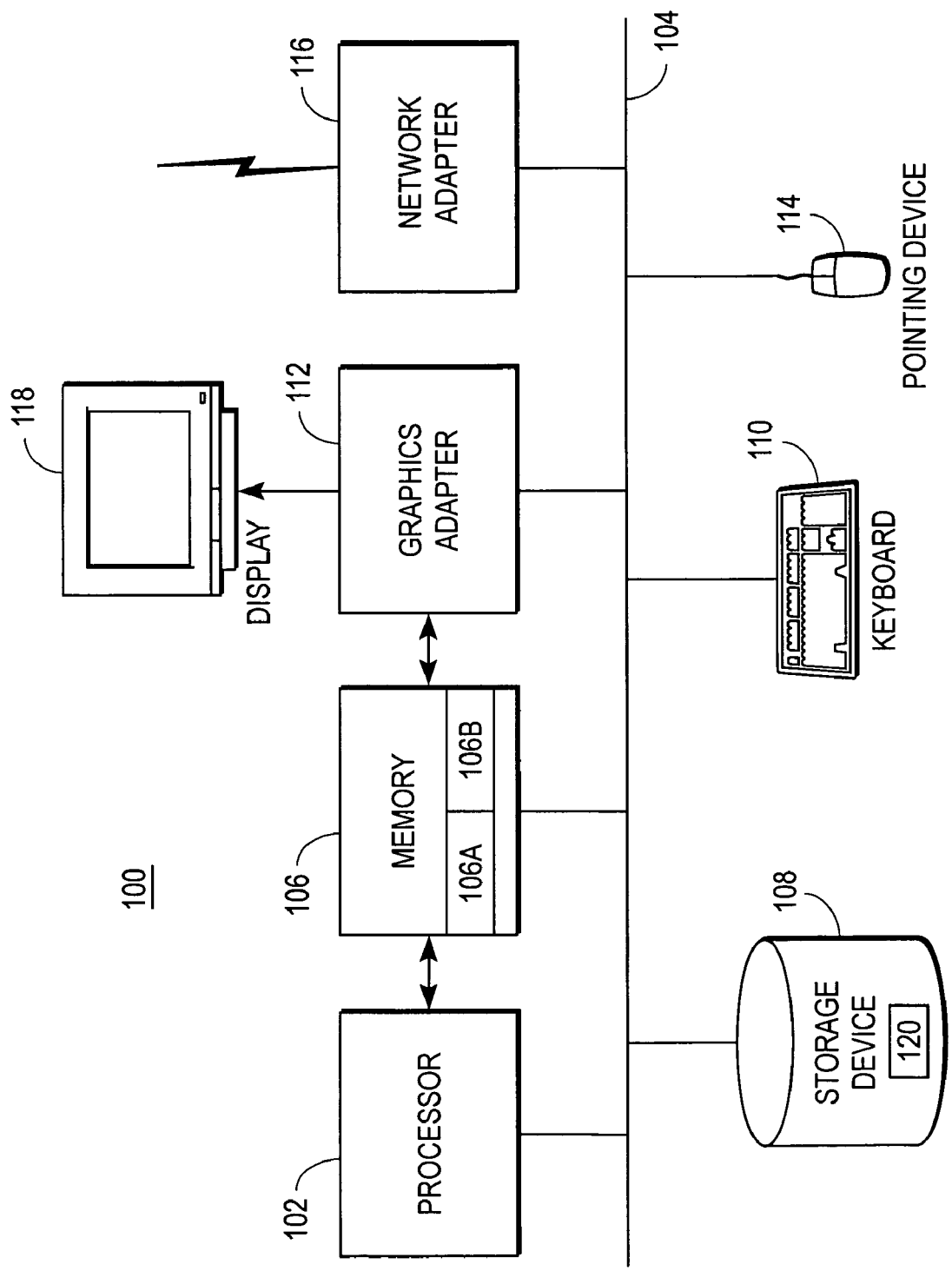
FIG. 1 is a high-level block diagram of a computer for executing a security module.

FIG. 1 is a high-level block diagram of a computer 100. In one embodiment, the computer 100 is a conventional computer and is utilized by an end-user to perform conventional tasks, such as web serving and/or word processing. FIG. 1 illustrates that the computer 100 has a processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. Computers acting in different roles may have different and/or additional elements than the ones shown in FIG. 1. For example, a computer 100 acting as a web server might have greater processing power and a larger storage device than a computer system acting as a client workstation. Likewise, a computer 100 acting as a web server might lack devices such as a display 118 and/or keyboard 110 that are not necessarily required to operate it.

The processor 102 is a general-purpose processor such as an INTEL x86-, SUN MICROSYSTEMS SPARC-, or POWERPC-compatible CPU. In one embodiment, the memory 106 is a random access memory (RAM), but can also include or other types of memory such as firmware, read-only memory (ROM), and non-volatile random access memory (NVRAM). The memory 106 holds instructions and data used by the processor 102.

The pointing device 114 is a mouse, track ball, pressure sensitive pad or other type of pointing device, and is used in combination with the keyboard 110 to input data into the computer 100. The graphics adapter 112 displays images and other information on the display 118. The network adapter 116 couples the computer 100 to a network such as the Internet. The storage device 108 is a hard disk drive and/or another device capable of storing data, such as a solid-state memory device.

As is known in the art, the computer 100 is adapted to execute computer programs. The computer programs and/or functional components of the programs are referred to herein as "modules." In one embodiment, the modules are stored as executable files on the storage device 108, although modules can also be stored in hardware and/or firmware. When utilized, the modules are loaded into the memory 106 and executed by the processor 102. Instances of executing programs are referred to as "processes." Moreover, each process can have sub-processes called "threads." The operating system is a program that controls the operation of the computer 100.

In one embodiment, the RAM within memory 106 is formed of multiple memory addresses, where each address holds a certain amount of data. The addresses can be aggregated into larger units, such as memory pages. In addition, the addresses can be virtualized in order to provide each process executing on the computer 100 with a large, contiguous memory address space.

Certain regions (i.e., ranges of addresses) of the memory 106 can be designated as executable 106A and hold instructions that are executed by the processor 102. Similarly, certain regions can be designated as non-executable 106B and hold data utilized by the executable instructions. These designations can be made on a global, per-process, and/or per-thread basis. For example, the stack and heap are two special regions of memory that are utilized by the operating system to control the operation of the computer 100 and typically do not store executable instructions. The stack is a data structure intended to store subroutine parameters and return addresses. Each process executing on the computer 100 can have its own stack. Likewise, each thread within a process can have its own stack. The heap is a pool of memory that is dynamically allocated and deallocated to processes by the operating system. Since these regions are not expected to hold executable instructions, the execution of an instruction from these regions is indicative of a possible buffer overflow attack against the computer 100.

In one embodiment, the processor 102 provides hardware support for designating memory regions as non-executable. An operating system can utilize this functionality to designate the stack, heap, and/or other memory regions as non-executable. If a process attempts to execute an instruction stored in a non-executable region, the processor 102 generates an exception that notifies the operating system and/or other processes executing on the computer of the attempt.

If the processor lacks hardware support for marking memory as non-executable, a process executing on the computer can effectively make the same determination by identifying the address of an instruction and then examining the memory 106 to determine whether the instruction resides in a non-executable region. For example, the software can determine if the address is within the stack, the heap, or another area of memory that is reserved for non-executable data. This check, however, requires the software to examine the computer's memory configuration and is computationally expensive.

In one embodiment of the present invention, the computer 100 is adapted to execute a security module 120 for detecting buffer overflow attacks. The security module 120 can be embedded into the operating system kernel and/or executed as a separate process (or be injected into an existing process). The security module 120 is illustrated within the storage device 108 because, in one embodiment, the security module is stored there, loaded into memory 106, and executed by the processor 102. The security module 120 correlates events that might initiate buffer overflow attacks with evidence that a buffer overflow attack is in progress. The security module 120 does not declare a buffer overflow attack unless the evidence of the attack follows a recent initiation event.

Figure 2:
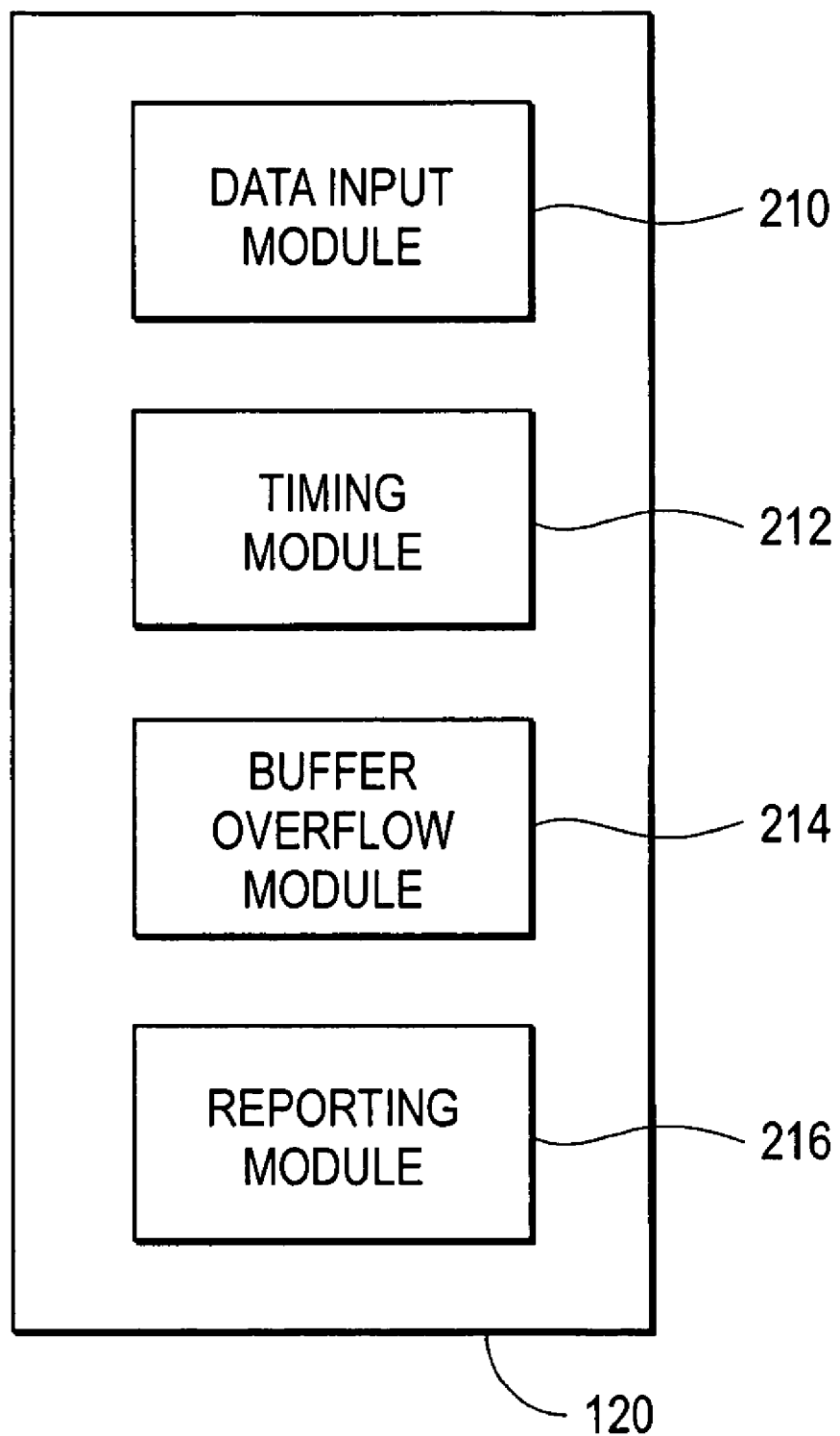
FIG. 2 is a high-level block diagram illustrating modules within the security module according to one embodiment.

FIG. 2 is a high-level block diagram illustrating modules within the security module 120 according to one embodiment. Those of skill in the art will recognize that other embodiments of the security module 120 can include additional and/or different modules than the ones shown in FIG. 2. Moreover, the functionalities can be distributed among the modules in a different manner than described here.

A data input module 210 detects possible buffer overflow initiation events. These events occur when malicious software has an opportunity to overflow a buffer, such as when a process receives data from an external source. For example, reading from a file, reading from a network socket, and/or receiving a message passed from the operating system or another application are the types of events that might initiate a buffer overflow condition. In one embodiment, the data input module 210 detects these events by hooking into the operating system application program interface (API) calls that processes use to perform these activities, and redirecting the calls to the data input module 210 instead of their intended targets. Once the data input module 210 concludes operation, it passes control to where it would have gone absent the hook.

A timing module 212 works in tandem with the data input module 210 and produces timestamps for potential buffer overflow initiation events. The timestamp indicates the time that the possible buffer overflow-initiating system call was made. In one embodiment, the timing module 212 reads the value of the computer's clock and uses this value as the timestamp.

In one embodiment, the timing module 212 receives an identifier of the process that made the system call that constitutes the possible buffer overflow initiation event. The timing module 212 can use this identifier to segregate events from different processes. Furthermore, the timing module 212 can also be configured to generate timestamps for only a subset of the processes executing on the computer 100. This configuration can be used, for example, to disable timestamping for processes known to be impervious to buffer overflow attacks.

It is possible for the activities that constitute the buffer overflow attack to be contained within one thread of a process or spread among multiple threads. Therefore, one embodiment of the timing module 212 operates on a per-thread level in order to permit the timing to be performed at a fine grain. The timing module 212 according to the per-thread embodiment can contain additional logic for correlating behaviors of multiple threads of a process in order to determine if the threads' actions are related to a single buffer overflow attack.

The timing module 212 records the timestamps in a list or other data structure that allows for rapid lookup. This list can be analyzed to determine whether and when a particular process or thread performed a potential buffer overflow initiation event. In one embodiment, the timing module 212 maintains the list in a shared memory where it can be read by other modules of the security module 120. In order to prevent the list from growing excessively large, the timing module 212 deletes from the list events that have aged more than a predetermined time period.

Because the computer 100 can execute multiple processes and threads concurrently, it is possible for multiple potential buffer overflow initiation events to occur at approximately the same time. Therefore, one embodiment of the timing module 212 utilizes a mutual exclusion (MUTEX) lock or similar functionality to prevent the list from becoming corrupted.

A buffer overflow module 214 detects evidence of a buffer overflow condition on the computer 100. In one embodiment, this evidence is found when the processor 102 is instructed to execute, or is executing, an instruction residing in non-executable memory 106B. In one embodiment, the buffer overflow module 214 receives an exception signal from the processor 102 indicating that the processor was directed to execute an instruction residing in non-executable memory 106B.

In another embodiment, the buffer overflow module 214 hooks into the operating system API calls that are likely to be used by malicious code introduced into the computer 100 through a buffer overflow attack. For example, APIs utilized to open files, open network connections, delete files, launch system shells, etc. are likely to be called by malicious code once it has started running on the host computer 100 because these calls allow the code to perform malicious actions. Once called through a hook, the buffer overflow module 214 checks whether the calling code is running in a memory region designated as non-executable 106B, such as within the stack or the heap. This technique does not necessarily detect malicious code the moment it starts running, but will detect the code as soon as it tries to do something malicious.

Some legitimate processes will perform actions, such as executing instructions in non-executable memory 106B, that cause the detection of a buffer overflow condition. Therefore, using this evidence alone to declare a buffer overflow attack will result in false positives. One embodiment of the buffer overflow module 214 thus reduces false positives by correlating evidence of buffer overflow attacks with events that are likely to have introduced the buffer overflow. To this end, the buffer overflow module 214 determines the current time and checks the list maintained by the timing module 212 to determine whether the calling process/thread performed a correlating potential buffer overflow initiation event. An initiating event is said to correlate with the evidence of the attack if it was performed within a specified time period by the same process and/or thread. The buffer overflow module 214 does not declare that a buffer overflow attack is in progress unless the evidence of the attack has a correlated initiating event.

The time period that determines whether events correlate can vary depending upon factors such as the operating system, process, and/or thread that performed the events. Likewise, the time period can be determined by parameters set by the end-user or another entity on the computer 100. For example, the security module 120 can present the end-user with a menu option that allows the end-user to select his tolerance for false positive detections, and the correlating time period can be adjusted in response to the user's selection. In another example, the time period can be controlled and tuned by malicious software detection definitions that are supplied to the security module 120 by an external source such as the company that provides the security module. Thus, different processes and/or threads can have different correlating time periods as specified by the definitions. In one embodiment, the time period is 10 milliseconds.

A reporting module 216 reports the outcome of the analysis performed by the buffer overflow module 214. In one embodiment, the reporting module 216 provides a dialog box or other notification to an end-user of the computer 100 that indicates that a buffer overflow attack has been detected and provides the end-user with the opportunity to terminate the offending process or thread. In another embodiment, the reporting module 216 reports the results of the analysis to other modules executing on the computer 100. For example, the reporting module 216 can report the result to another module that initiates a virus scan of the offending process/thread and/or logs the positive and false positive detections for subsequent analysis.

Figure 3:
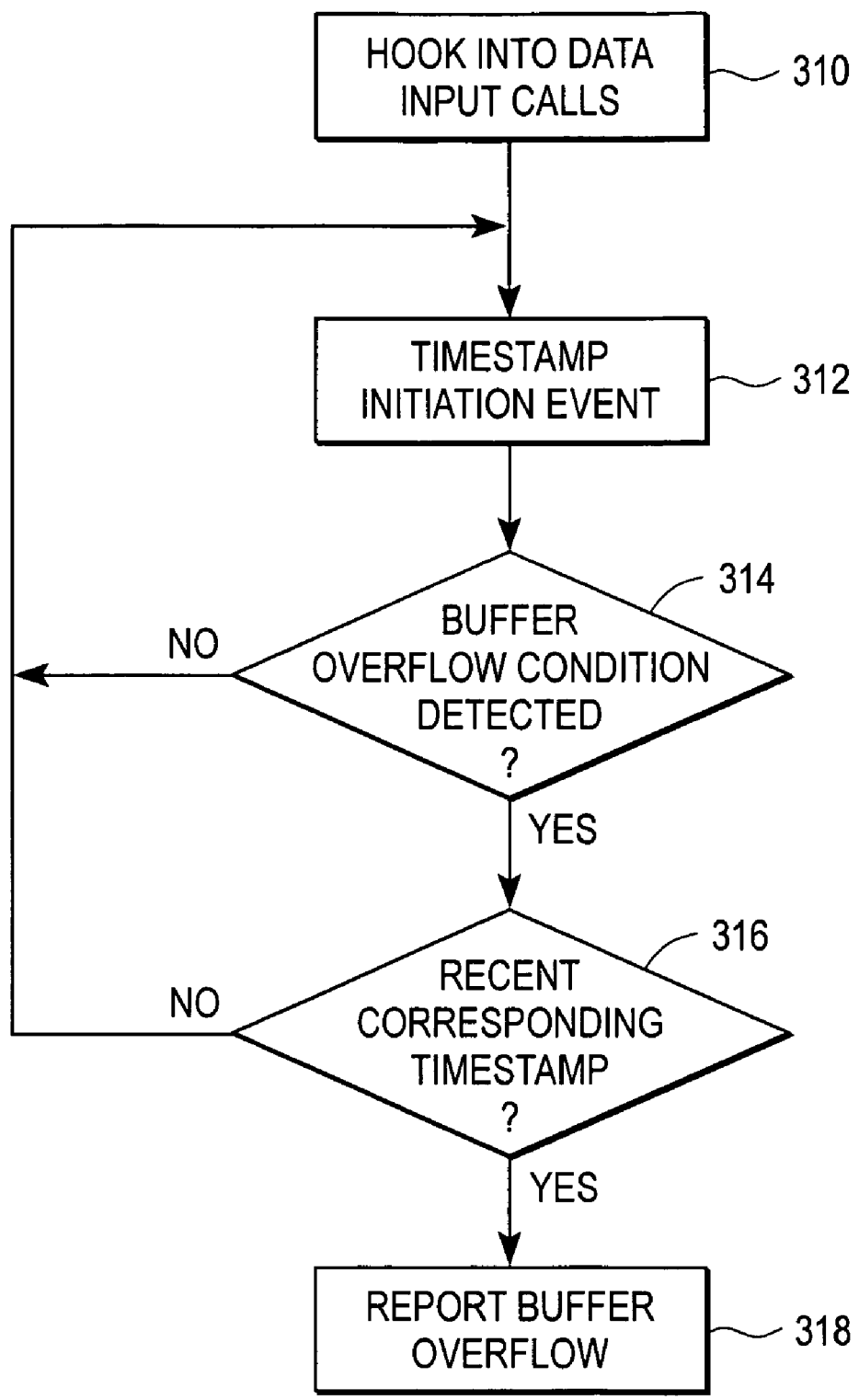
FIG. 3 is a flow chart illustrating steps performed by the security module according to an embodiment where the processor provides support for blocking execution of code from memory regions designated as non-executable.

FIG. 3 is a flow chart illustrating steps performed by the security module 120 according to one embodiment where the processor 102 provides support for blocking execution of code from memory regions designated as non-executable 106B. Those of skill in the art will recognize that different embodiments can perform other and/or additional steps than the ones shown in FIG. 3. Moreover, other embodiments can perform the steps in different orders than the one shown.

The security module 120 hooks 310 into the data input calls in order to detect possible buffer overflow initiation events. When the security module 120 detects such an event, it generates and records 312 a timestamp and saves this timestamp along with an indication of the process and/or thread to which the event pertains. At some point during the operation of the computer 100, the computer detects 314 evidence of a buffer overflow condition. In the embodiment of FIG. 3, this detection 314 occurs when the processor 102 generates an exception indicating that it was asked to execute an instruction stored in non-executable memory 106B.

Upon receiving the exception from the processor 102, the security module 120 examines the timestamps and determines 316 whether there is a correlating buffer overflow initiation event for the process and/or thread that caused the processor 102 to generate the exception. If 316 there are no correlating events for the process and/or thread, then the instruction is allowed to execute and the security module 312 continues to monitor for buffer overflow initiation events 312 and buffer overflow conditions 314. If 316 there is a correlating initiation event, the security module 120 responds 318 to the buffer overflow by terminating the process and/or thread that caused the buffer overflow condition, notifying the end-user of the buffer overflow, and/or performing other steps.

Figure 4:
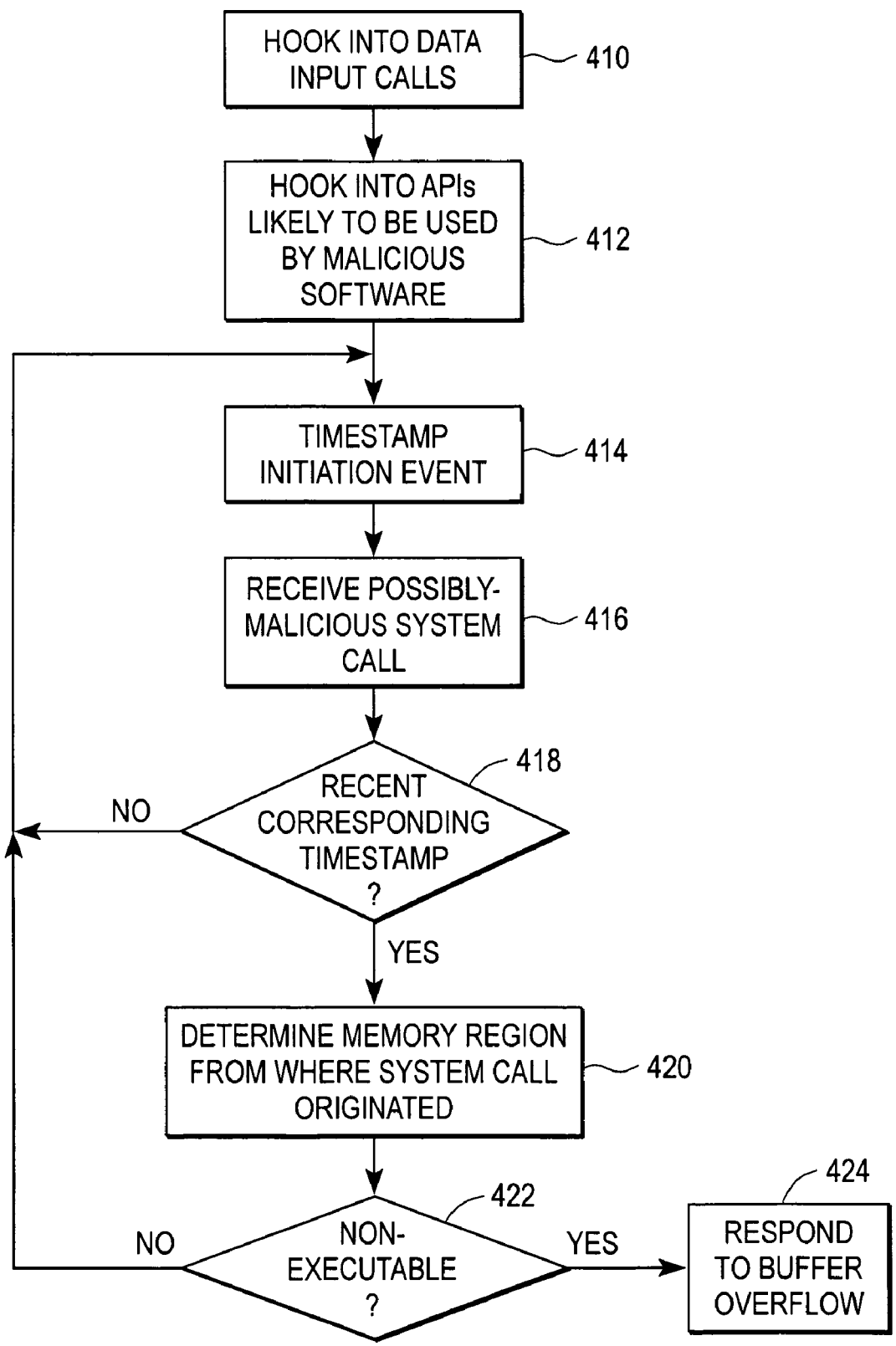
FIG. 4 is a flow chart illustrating steps performed by the security module according to an embodiment where the processor does not necessarily provide support for blocking execution of code from memory regions designated as non-executable.

FIG. 4 is a flow chart illustrating steps performed by the security module 120 according to an embodiment where the processor 102 does not necessarily provide support for blocking execution of code from memory regions designated as non-executable 106B. Those of skill in the art will recognize that other embodiments can perform other and/or additional steps than the ones shown in FIG. 4. Moreover, other embodiments can perform the steps in different orders than the one shown.

The security module 120 hooks 410 into the data input calls in order to detect buffer overflow initiation events. The security module 120 also hooks 412 into APIs that are likely to be used by malicious code once it has begun executing due to a buffer overflow attack. When the security module 120 detects a data input call, it generates and records 414 a timestamp and saves this timestamp along with an indication of the process and/or thread that made the call.

At some point during its operation, a process and/or thread makes a call to one of the APIs that are likely to be used by malicious code. The security module 120 receives 416 this possibly-malicious call and determines 418 whether there is a correlating buffer overflow initiation event for the process and/or thread that made the call. If 418 there are no correlating events for the process and/or thread, then the security module 120 continues to monitor 414 for buffer overflow initiation events.

If 418 there is a correlating initiation event, the security module 120 determines 420 whether the instruction that made the call is executing in a memory region 106B marked as non-executable. If 422 the caller is executing in non-executable memory 106B, the security module 120 responds 424 to the buffer overflow by terminating the process and/or thread that caused the buffer overflow condition, notifying the end-user of the buffer overflow, and/or performing other steps. If 422 the caller is executing in executable memory 106A, the security module 120 executes the instruction and returns to step 414 to monitor for buffer overflow initiation events and possibly-malicious API calls 416.

Those of skill in the art will recognize that in some embodiments it is computationally more expensive to determine whether a calling process or thread is executing in non-executable memory than it is to determine whether there is a recent timestamp. For this reason, the method of FIG. 4 is ordered to reduce occurrences of the memory determination step 420. In other embodiments, the steps can be ordered to reduce occurrences of the recent timestamp determination step 418.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method of detecting a buffer overflow attack attempting to execute malicious software on a computer, comprising:
   recording, by a security module executing on the computer, a time of occurrence of a possible buffer overflow attack initiation event;
   determining, by the security module executing on the computer, a time of occurrence of an action possibly performed as a result of a buffer overflow attack;
   determining, by the security module executing on the computer and responsive to the times of occurrence, whether the action correlates with the possible buffer overflow attack initiation event; and
   responsive to a positive correlation, declaring, by the security module executing on the computer, a buffer overflow attack on the computer.

2. The method of claim 1, wherein recording a time of occurrence of a possible buffer overflow attack initiation event comprises:
   detecting a data input action performed on the computer; and
   generating a timestamp for the data input action.

3. The method of claim 1, wherein determining a time of occurrence of an action possibly performed as a result of a buffer overflow attack comprises:
   determining whether the computer is instructed to execute an instruction stored in a region of computer memory marked as non-executable.

4. The method of claim 1, wherein determining a time of occurrence of an action possibly performed as a result of a buffer overflow attack comprises:
   monitoring the computer for an action that the malicious software is likely to perform;
   upon detecting an action that the malicious software is likely to perform, determining whether the action was performed by an instruction stored in a region of memory marked as non-executable.

5. The method of claim 4, wherein monitoring the computer comprises:
   hooking into operating system application program interface (API) calls for performing one or more actions from the group consisting of:
   opening a file, opening a network connection, deleting a file, and launching a system shell.

6. The method of claim 1, wherein determining, responsive to the times of occurrence, whether the action correlates with the possible buffer overflow attack initiation event comprises:
   comparing the time of occurrence of the action with the time of occurrence of the possible buffer overflow attack initiation event; and
   declaring a positive correlation if the times of occurrence are within a predetermined time interval.

7. The method of claim 1, wherein determining whether the action correlates with the possible buffer overflow attack initiation event comprises:
   determining whether the possible buffer overflow attack initiation event and the action possibly performed as a result of the buffer overflow attack were performed by a same process executing on the computer.

8. The method of claim 1, wherein determining whether the action correlates with the possible buffer overflow attack initiation event comprises:
   determining whether the possible buffer overflow attack initiation event and the action possibly performed as a result of the buffer overflow attack were performed by threads of a same process executing on the computer.

9. A system for detecting a buffer overflow attack attempting to execute malicious software on a computer, comprising:
   a computer-readable storage medium storing executable computer program instructions comprising:
      a data input module adapted to detect a possible buffer overflow attack initiation event;
      a timing module adapted to record a time of occurrence of the possible buffer overflow attack initiation event; and
      a buffer overflow module adapted to:
         determine a time of occurrence of an action possibly performed as a result of a buffer overflow attack;
         determine, responsive to the times of occurrence, whether the action correlates with the possible buffer overflow attack initiation event; and
         responsive to a positive correlation, declare a buffer overflow attack on the computer; and
   a processor for executing the computer program instructions.

10. The system of claim 9, wherein the possible buffer overflow attack initiation event comprises a data input action performed on the computer and wherein the timing module is further adapted to:
    generating a timestamp for the data input action.

11. The system of claim 9, wherein the buffer overflow module is further adapted to:
    monitor the computer for an action that the malicious software is likely to perform; and
    upon detecting an action that the malicious software is likely to perform, determine whether the action was performed by an instruction stored in a region of memory marked as non-executable.

12. The system of claim 11, wherein the buffer overflow module is further adapted to:
    hook into operating system application program interface (API) calls for performing one or more actions from the group consisting of:
    opening a file, opening a network connection, deleting a file, and launching a system shell.

13. The system of claim 9, wherein the buffer overflow module is further adapted to:
    compare the time of occurrence of the action with the time of occurrence of the possible buffer overflow attack initiation event; and
    declare a positive correlation if the times of occurrence are within a predetermined time interval.

14. The system of claim 9, wherein the buffer overflow module is further adapted to:

determine whether the possible buffer overflow attack initiation event and the action possibly performed as a result of the buffer overflow attack were performed by a same process executing on the computer.

15. The system of claim 9, wherein the buffer overflow module is further adapted to:
determine whether the possible buffer overflow attack initiation event and the action possibly performed as a result of the buffer overflow attack were performed by threads of a same process executing on the computer.

16. A computer-readable storage medium storing executable computer program instructions for detecting a buffer overflow attack attempting to execute malicious software on a computer, the computer program instructions comprising instructions for:
recording a time of occurrence of a possible buffer overflow attack initiation event;
determining a time of occurrence of an action possibly performed as a result of a buffer overflow attack;
determining, responsive to the times of occurrence, whether the action correlates with the possible buffer overflow attack initiation event; and
responsive to a positive correlation, declaring a buffer overflow attack on the computer.

17. The computer-readable storage medium of claim 16, wherein recording a time of occurrence of a possible buffer overflow attack initiation event comprises:
detecting a data input action performed on the computer; and
generating a timestamp for the data input action.

18. The computer-readable storage medium of claim 16, wherein determining a time of occurrence of an action possibly performed as a result of a buffer overflow attack comprises:
determining whether the computer is instructed to execute an instruction stored in a region of computer memory marked as non-executable.

19. The computer-readable storage medium of claim 16, wherein determining a time of occurrence of an action possibly performed as a result of a buffer overflow attack comprises:

monitoring the computer for an action that the malicious software is likely to perform; and
upon detecting an action that the malicious software is likely to perform, determining whether the action was performed by an instruction stored in a region of memory marked as non-executable.

20. The computer-readable storage medium of claim 19 wherein monitoring the computer comprises:
hooking into operating system application program interface (API) calls for performing one or more actions from the group consisting of:
opening a file, opening a network connection, deleting a file, and launching a system shell.

21. The computer-readable storage medium of claim 16, wherein determining, responsive to the times of occurrence, whether the action correlates with the possible buffer overflow attack initiation event comprises:
comparing the time of occurrence of the action with the time of occurrence of the possible buffer overflow attack initiation event; and
declaring a positive correlation if the times of occurrence are within a predetermined time interval.

22. The computer-readable storage medium of claim 16, wherein determining whether the action correlates with the possible buffer overflow attack initiation event comprises:
determining whether the possible buffer overflow attack initiation event and the action possibly performed as a result of the buffer overflow attack were performed by a same process executing on the computer.

23. The computer-readable storage medium of claim 16, wherein determining whether the action correlates with the possible buffer overflow attack initiation event comprises:
determining whether the possible buffer overflow attack initiation event and the action possibly performed as a result of the buffer overflow attack were performed by threads of a same process executing on the computer.

* * * * *